Aug. 12, 1958 C. PLEGER 2,846,903
MACHINE TOOLS WITH A HYDRAULIC FEED ARRANGEMENT
FOR A ROTATING SPINDLE SUPPORTING THE TOOL
Filed June 27, 1955 3 Sheets-Sheet 1

Inventor:
C. Pleger

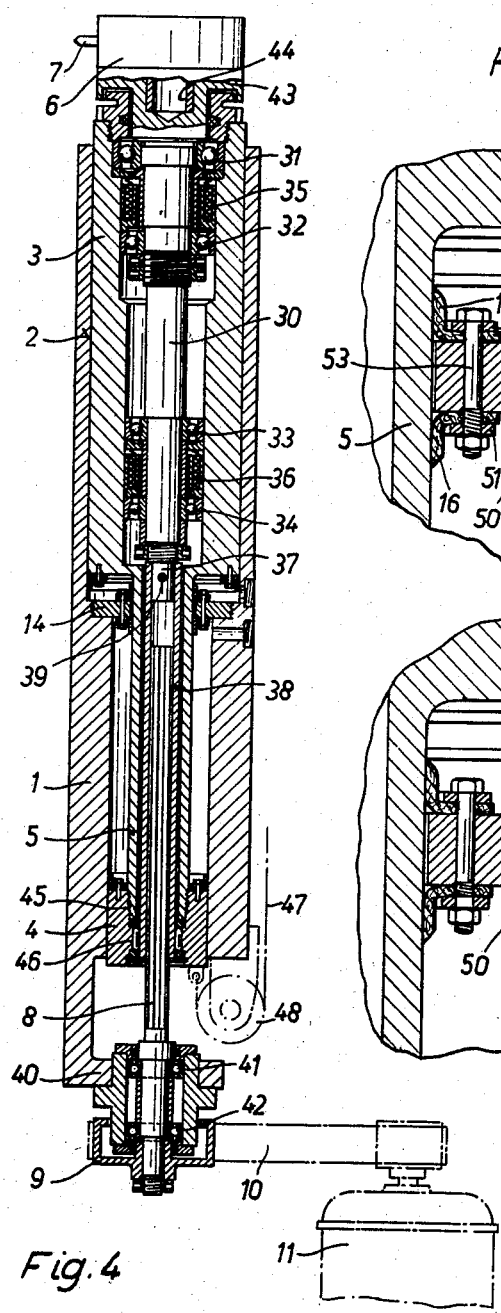
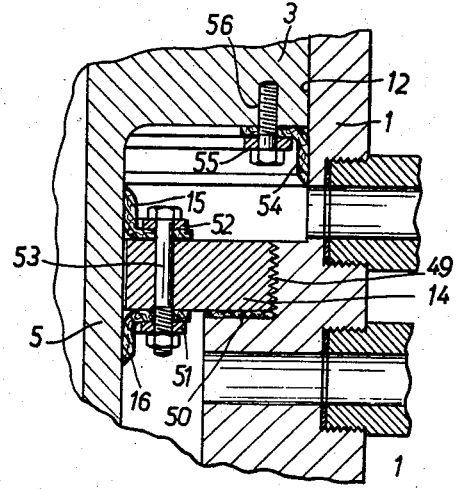
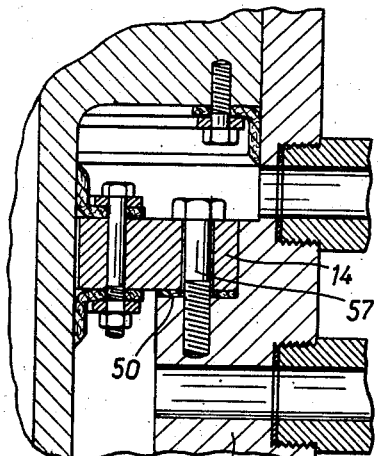
Fig. 4
Fig. 5
Fig. 6

United States Patent Office 2,846,903
Patented Aug. 12, 1958

2,846,903

MACHINE TOOLS WITH A HYDRAULIC FEED ARRANGEMENT FOR A ROTATING SPINDLE SUPPORTING THE TOOL

Curt Pleger, Zurich-Erlenbach, Switzerland

Application June 27, 1955, Serial No. 518,223

3 Claims. (Cl. 77—33.5)

This invention relates to a machine tool having a hydraulic feed arrangement for a rotating tool-supporting spindle, the hydraulic feed arrangement advancing or retracting the tool-supporting spindle in the axial direction.

The invention has for its object to create a machine tool of the aforesaid kind, the hydraulic feed arrangement of which provides a very accurate guidance of the tool spindle.

The invention has the further object of providing a hydraulic feed arrangement for a rotating spindle, in which the external diameter of the feed arrangement is as small as possible, in order to enable a plurality of feed arrangements to be mounted as closely next to one another as possible in one tooling machine.

A further object of the invention is so to construct the feed arrangement for the rotating spindle that the heat generated in the bearings supporting the spindle can be conveyed away as effectively as possible, in order that for supporting the spindle accurately fitting anti-friction bearings may be used.

Further objects and advantages of a machine tool with a hydraulic feed arrangement according to the invention will be gathered from the following description and drawings of a constructional example relating to a fine boring machine capable of being used either as a single tooling unit or as part of a multispindle fine boring machine.

The fine boring machine illustrated in the drawings is intended to serve only as an example for the possible applications of the invention which is not limited to the illustrated constructional example.

In the accompanying drawings:

Fig. 4 shows in section a fine bore machine unit according to Fig. 1;

Fig. 5 is a part section through the middle part of the feed arrangement with the flange separating the two pressure oil spaces of the fine boring machine unit;

Fig. 6 shows a similar section to that of Fig. 5, which however represents another method of fixing the flange.

Figures 1, 2, 3:
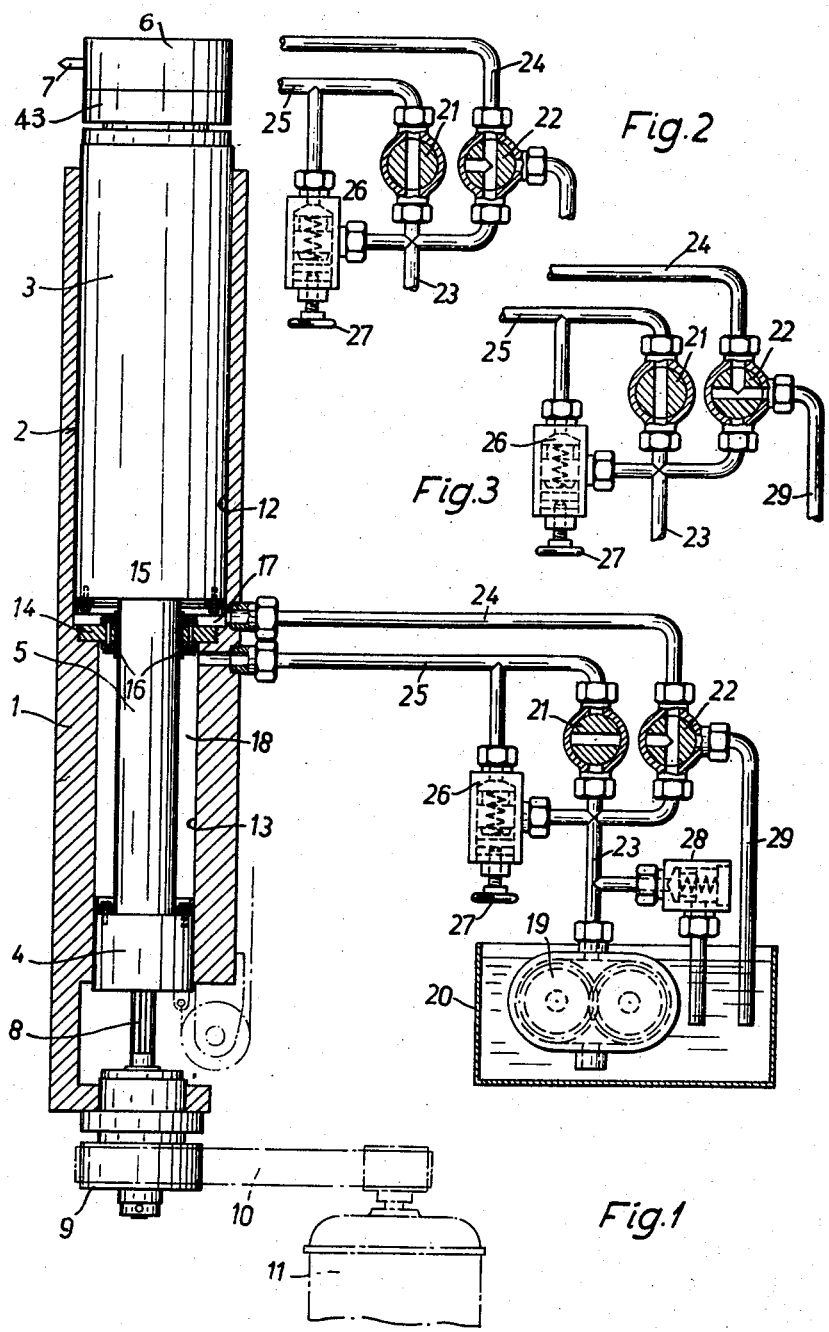
Fig. 1 is a diagrammatic representation of the fine bore machine unit with the pressure oil installation required for controlling the hydraulic feed arrangement.
Figs. 2 and 3 show different positions of the valves of the pressure oil installation.

The elongated casing 1 of the fine boring unit shown in Fig. 1 acts as a hydraulic cylinder, in which the socket constructed as a spindle sleeve 2 and composed of the two pistons 3 and 4 and the shaft part 5 connecting these pistons is guided so as to be axially slidable and in the interior of which the tool spindle (shown at 30 in Fig. 4) is rotatably supported. In the tool spindle is supported the tool head 6, in which the cutting tool 7 is held. Out of the lower end of the spindle sleeve 2 projects the fluted shaft 8 driving the tool spindle, on which the belt pulley 9 is fixed. This belt pulley 9 is driven by way of the belt 10 by the electric motor 11. The elongated casing 1 has a stepped cylindrical bore open at both ends, the upper part 12 of which is of greater diameter than the lower part 13. At the place of transition between the bore 12 and the bore 13 is the internal flange 14 which is provided with packing discs 15 and 16 which bear in a fluidtight manner against the shaft part 5 of the spindle sleeve 2. This internal flange 14 thus separates from one another two pressure spaces 17 and 18 from one another, which are shut off to the outside by the pistons 3 and 4.

These pressure spaces are fed by the oil pump 19 with pressure oil which this pump draws from the container 20 and conveys by way of the two controllable valves 21 and 22, according to the setting of these valves, to one pressure space or the other.

In the position shown in Fig. 1 the oil pump 19 is connected by way of the pressure oil pipe 23, the valve 22 and the pipe 24 with the pressure space 17 of the hydraulic feed arrangement. The pressure oil forces the spindle sleeve 2 upwards, the piston 4 forcing the oil contained in the pressure space 18 by way of the pipe 25 and the excess pressure or non-return valve 26 into the pipe 23. As the piston surface of the upper piston 3, acted on by the pressure oil, is considerably greater than the effective piston surface of the piston 4, the pressure of the oil in the pressure space 18 will also be higher than the pressure in the pressure space 17, so that the oil will be forced out of the pressure space 18 against the pressure of the oil pump 19 into the pipe 23. The non-return valve 26 is adjustable, its cross-section being regulable by means of the handwheel 27, so that by adjusting this valve the speed at which the spindle sleeve 2 is raised can be adjusted to the values desired in each case. On excessive pressures occurring in the pipe 23, oil can run back by way of the excess pressure valve 28 into the container 20.

It is obvious, that on the spindle sleeve 2 lifting, the rotating tool spindle with the tool head 6 will also be lifted, the rapidly rotating cutting tool 7 boring out the work (not shown). On the spindle sleeve 2 reaching its highest working position, the valve 22 is closed, whereupon the motion of the spindle sleeve 2 upwards immediately ceases.

When for any reason a rapid feed is required, the valves 21 and 22 are brought into the position shown in Fig. 2, the oil flowing down out of the pressure space 18 being then free to run back through the opened valve 21 freely into the pipe 23.

In order to move the spindle sleeve downwards again, the valves 21 and 22 are turned into the position shown in Fig. 3, in which the pressure oil flows out of the pipe 23 by way of the opened valve 21 into the pressure space 18, whilst the oil flowing down out of the pressure space 17 flows back by way of the valve 22 into the outflow pipe 29 and through this pipe into the oil container 20.

According to the illustration of the mode of operation of the hydraulic feed arrangement the details of the fine boring machine unit according to the invention will now be more particularly described with reference to the illustration in Figs. 4, 5, 6 and 7. Fig. 4 shows an axial section through the casing 1 and the spindle sleeve 2, which is intended to show the arrangement, the manner of support and the drive of the tool spindle 30.

The parts already referred to in the description of Fig. 1 bear the same reference numerals as in Fig. 1. In the upper piston 3 of the spindle sleeve 2 the tool spindle 30 is supported in four ball bearings 31, 32, 33 and 34, of which the bearings 31 and 32 and the two bearings 33 and 34 are in each case put under pressure axially by springs 35 and 36 placed between the bearings, in order to prevent any play in these bearings and to cause the shaft 30 to run exactly centrally. With the lower end 37 of the spindle 30 the sleeve 38 is connected by means of the cross-pin 39. The sleeve is provided with inwardly projecting ribs which engage in the grooves of the fluted shaft 8. The fluted shaft 8 is supported in the extension 40 of the casing 1 by means of the two ball bearings 41 and 42. At its end is mounted the belt pulley 9, by way of which the drive of the fluted shaft 8 and consequently of the tool spindle 30 is conveyed from the motor 11.

At the upper end of the tool spindle 30 is a collar 43 which contains an accurately calibrated bore 44 for the reception of the tool head 6.

As the section through the lower piston 40 shows clearly, the piston 4 is screwed by means of the thread 45 on the tubular shaft 5. In the piston 4 is also supported the sleeve 38 in needle bearings 46. To the piston 4 is also secured a cord 47 which runs over a pulley 48 supported on the casing 1 and through which fixed electric contacts (not shown) can be operated, which, on the spindle sleeve 2 reaching its end position, change over the valves 21 and 22 (cf. Figs. 1 to 3) by way of electromagnets (not shown).

Figure 7:
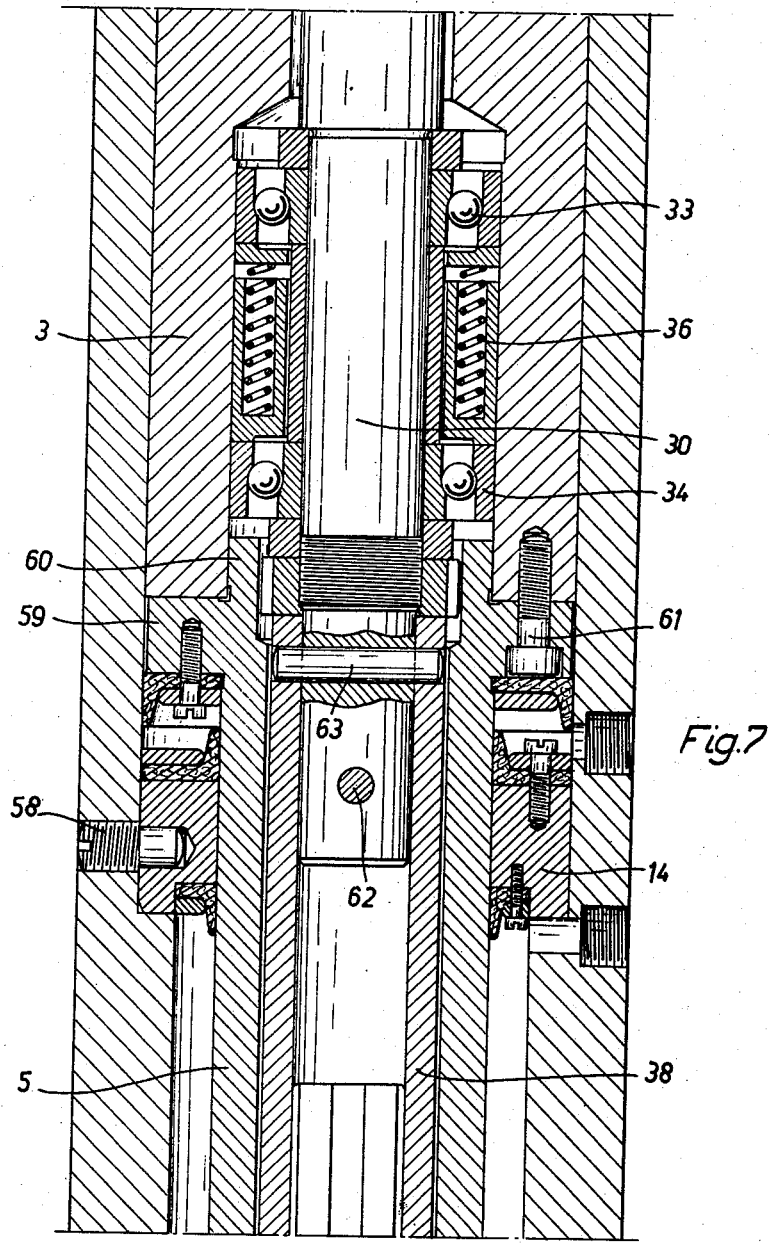
Fig. 7 shows a part section through the middle part of the fine bore machine unit, illustrating the connection between the driving shaft and the tool spindle.

In Figs. 5, 6 and 7 details are shown to a larger scale, Fig. 5 showing the manner of fixing the intermediate flange 14 by means of a thread 49 which is cut in a recess of the casing 1. Below the intermediate flange 14 is the packing ring 50 which renders the flange 14 fluidtight with respect to the casing 1. The two packings 15 and 16 at the inside of the annular flange 14, which bear in a fluidtight manner against the outer peripheral surface of the hollow shaft 5, are fixed by means of the washers 51 and 52 and the screw bolt 53 to the annular flange 14. On the piston 3 is mounted a similar packing 54 which is secured by means of the ring 55 and the screw 56 to the piston 3 and which renders the piston fluidtight with respect to the inner surface of the cylindrical bore 12 of the casing 1.

In the illustration according to Fig. 6 the intermediate ring 14 is fixed in the casing 1 by means of the screws 57 passing through the packing 50. The remaining parts shown in this figure correspond to the parts bearing the same reference numeral in Fig. 5.

As will be readily understood, the casing 1 may also be made in two parts, the separating joint between these two parts lying at the place where the internal flange or intermediate ring 14 has to be inserted. In such a case this internal flange can be clamped firmly between the two parts of the casing. Such a construction simplifies the accurate making of the cylindrical bores 12 and 13, but presents difficulties in assembling the parts, when the two parts of the casing have to be accurately tightened up with respect to one another, so as to be in axial alinement.

Fig. 7 shows a further modified form of fixing the intermediate flange 14 by means of the set screws 58 which are screwed in from the outside through the wall of the casing. This figure also shows a different way of mounting the ball bearings 33 and 34 supporting the rear end of the spindle, which are braced against one another axially by the spring 36. In this modified form the spindle sleeve 2 is divided at the place of transition from the forward piston part 3 to the shaft 5, the shaft 5 having a flange 59 and a seating extension 60, by means of which it is connected exactly concentrically and coaxially with the piston part 3 of the spindle sleeve. The screw bolts 61 hold the piston part 3 and the shaft part 5 of the spindle sleeve together. The lower end of the tool spindle 30 is connected with the fluted shaft sleeve 38 by two joint pins 62 and 63 lying at right angles to one another.

It will be seen from the drawings, that the guiding of the spindle sleeve 2 and consequently that of the tool spindle 30 is very good in all operative positions. The guiding surface at the same time forms the inner cylindrical surface of the feed cylinder. Since the pressure with which the hydraulic feed arrangement is driven is not limited to any definite value, the diameter of the feed arrangement can be made so small that the diameter of the spindle sleeve guide which is definitely required for reasons of surface pressure loading is at the same time the greatest internal diameter of the feed arrangement itself. In the hitherto known constructions, in which special pistons shrunk on the outside of the feed sleeve are used as feed pistons, the diameter of the feed arrangement must be considerably greater than the diameter of the guiding seating of the spindle sleeve.

The spindle sleeve constructed according to the invention, the piston 3 of which bears over its entire axial length with a snug fit against the guiding bore in the casing 1, provides the advantage, that the heat occurring in the ball bearings 31, 32, 33 and 34 is conveyed rapidly by way of the outer bearing rings and the thick solid part of the piston 3 to the outer wall of the cylinder, that is the casing 1, and heat accumulations which may lead to undesirably high bearing stresses are with certainty avoided.

Fundamentally, the spindle sleeve 2 is to perform only purely axial sliding motions within the two bores 12 and 13 of the casing 1. As, however, the spindle sleeve has the form of a body of revolution, it is also possible for this spindle sleeve to perform during its axial displacement a slow rotary motion which is determined, for instance, by the frictional torque occurring in the bearings. Such a rotary motion of the spindle sleeve improves, as will be readily seen, the lubrication between the guiding surfaces of the pistons 3 and 4 and the internal surfaces of the bores 12 and 13.

When a rotary motion of the spindle sleeve 2 is to be made use of, the actuating device consisting of the cord 47 and the pulley 48 for the control device for controlling the valves 21 and 22 must, of course, be differently constructed, in order that this control device shall not hinder the rotary motion of the spindle sleeve.

The fine boring machine illustrated in the drawings may be used as a separate tooling unit, for instance at a conveyer belt, in which case it is mounted in a manner known per se in a framework erected alongside the conveyer belt. The machine may, however, also be assembled with a number of other similar machines to form a machine block, for instance for simultaneously boring out four cylinders lying next to one another of an engine cylinder block. When several fine boring machines are combined in one machine block, the control of the individual feed cylinders can be effected jointly by way of a single control valve. When the control valves of the individual fine boring machines are electrically operated, the valves may be only electrically coupled and switches provided in the electric operating circuits, which enable the individual fine boring machines to be controlled independently.

I claim:

1. A fine-boring machine, comprising: a machine casing, a hydraulic feed cylinder forming an integral part of the casing, an annular flange projecting inwards from the internal surface of the cylinder about midway between its ends, a spindle sleeve axially slidable in the cylinder, the spindle sleeve consisting of two pistons and an axial shank uniting them, the diameter of the shank being less than the diameter of the pistons, sealing means enabling the shank of the spindle sleeve to slide through the annular flange of the cylinder in a fluidtight manner, a tool spindle rotatable but not axially slidable in the spindle sleeve, the tool spindle being adapted to carry a fine-boring tool, means for selectively supplying liquid under pressure to the two cylinder spaces bounded by the two pistons and the annular flange, the bore of the hydraulic cylinder constituting the sole guiding means for the spindle sleeve, the piston nearer to the boring tool being of considerable axial length and being a close sliding fit in the cylinder, and two separate bearings well spaced apart guiding the tool spindle in the said long piston near the boring tool.

2. A fine-boring machine as claimed in claim 1, wherein the long piston of the spindle sleeve is of greater diameter than the piston more remote from the boring tool.

3. A fine-boring machine as claimed in claim 2, each of the said two separate bearings including two single rolling-friction bearings, and compression springs urging the two single bearings away from one another in an axial direction, and the spindle sleeve including abutments restricting axial movement of the said bearings.

References Cited in the file of this patent

UNITED STATES PATENTS 2,541,306  Taylor _____ Feb. 13, 1951